April 25, 1933.  A. E. WEBER ET AL  1,906,028

UPHOLSTERY PAD AND METHOD OF MAKING THE SAME

Filed Sept. 17, 1930  2 Sheets-Sheet 2

INVENTORS:
ARTHUR ERNEST WEBER
JOSEPH ARTHUR HOWARD
BY: Ruege, Boyce & Bakelar
ATTORNEYS.

Patented Apr. 25, 1933

1,906,028

UNITED STATES PATENT OFFICE

ARTHUR ERNEST WEBER, OF FOREST HILL, LONDON, AND JOSEPH ARTHUR HOWARD, OF STREATHAM HILL, LONDON, ENGLAND, ASSIGNORS TO THE HAIRLOCK COMPANY INC., OF NEW YORK, N. Y., A CORPORATION OF DELAWARE

UPHOLSTERY PAD AND METHOD OF MAKING THE SAME

Application filed September 17, 1930, Serial No. 482,518, and in Great Britain September 24, 1929.

This invention relates to upholstery stuffing materials for imparting resilient surfaces to seats, cushions and other upholstered objects and articles of upholstery including mattresses.

It has already been proposed for various purposes to impregnate animal and vegetable upholstery fibres with adhesives including rubber and rubber latex.

The chief object of the present invention, however, is to enable definite inherent shapes to be imparted to pads of upholstery stuffing materials. Another object is to provide a stuffing material having lasting and desirable cushioning properties and at the same time provide lightness and economy of material by permitting a minimum quantity of such stuffing material to be employed to obtain a maximum distending effect.

For the above purpose, a mass of intermingled ordinary upholstery stuffing fibres, such as for instance horsehair, pig's hair or the substitutes therefor such as, for example, Algerian grass or coconut fibre, is wetted with a flexible adhesive, and according to the present invention, is given a truss form with the fibres secured together at their crossing positions by the adhesive, and in the preferred form of the invention which is herein described the wetted material, in a loosely associated condition is confined approximately without compression in a mould of the desired shape and dried. The result is a trussed, open-mesh structure of upholstery stuffing capable of resiliently yielding under compression yet permanently tending to retain or acquire the shape imparted thereto by the mould. Thus with a quantity of upholstery stuffing material normally sufficient in the loosely associated condition to occupy the volume of the space to be stuffed, such space can be permanently stuffed, without, as is usual, packing into such space several times the quantity of stuffing in a compacted condition.

The adhesive, by wetting the individual fibres, more or less removes from such fibres any tendency to assume fresh configurations so that on the fibres drying they are set in the configurations which they have individually assumed by confinement of the mass in the mould. Moreover the adhesive when dry itself forms a flexible sheath or coating on, and conforming to the acquired configuration of, each fibre, which sheath also tends when distorted to return to such acquired configuration. These effects are additional to the mere adherent interconnection of the fibres, in causing the pad constantly to tend to retain its moulded shape.

Any adhesive which, in the small quantities employed, is flexible when dry can be used, such as, for instance, rubber solution, rubber latex, guttapercha solution or latex, glue, and the like.

When rubber in any suitable form is employed it may be and preferably is vulcanized at a temperature non-injurious to the fibre.

It is obvious that mixed fibres may be employed, either homogeneously mixed or in layers of different fibres. For example, the outer or upper layer of the pad may be of horsehair, whereas the middle or lower portion may be of a horsehair substitute.

The fibre, for instance horsehair, can be wetted and individually coated with the adhesive, for instance rubber latex, by passing the fibre between a pair of rollers wetted with the adhesive. With rubber latex, the latex tends to accumulate in the nip of the rollers so that the rollers draw the fibre, for instance, hair through the accumulated latex. Hair thus treated recovers its loosely associated condition immediately on issuing from between the rollers, and may be at once placed in the mould and allowed to dry.

Alternatively, the hair or other fibre can be wetted by dipping it in or spraying it with the latex or other adhesive. The wet fibre can then be passed through a carding machine to assist it in recovering the loosely associated condition, before being shaped and dried in a mould.

The wet fibre can be handled with the aid of forks.

The wetted loosely associated fibre may be placed in the mould immediately after being wetted. Alternatively, the wetted fibre may be allowed partially to dry in small heaps or bunches and such partially dried heaps or bunches of fibre are lightly packed into the mould.

The fibre may be placed in the mould in the loosely associated condition prior to being wetted with the latex or other adhesive. Such wetting can be effected by dipping the filled mould into the latex or other adhesive, whereupon the mould is allowed to drain.

In all cases the moulded mass of fibre may be turned out of the mould or the mould may be lifted off therefrom, when the mass has merely partially dried sufficiently to retain the moulded shape imparted by the mould if immediately thereafter it is not handled or otherwise influenced. The moulded mass out of the mould can thereupon be allowed to dry completely, which drying will take place more rapidly than when the mass is within the mould.

The mould should be capable of draining and may be of perforated or gridlike structure to facilitate draining.

To permit dipping therein and draining, the flexible adhesive should obviously be sufficiently liquid, like ordinary rubber latex, to flow readily into and out of the mould.

With rubber latex the dipped horsehair or other upholstery fibres may not without preparation or repeated dipping take up sufficient rubber to form an effective sheath thereon. To promote the take-up of the rubber by the hair or other fibres, the loose mass of hair or other fibres may be previously permeated by an absorbent powder, such as French chalk or slaked lime. On dipping the mould with the confined loose mass of hair or other fibres therein, into the liquid rubber latex, the powder apparently absorbs the water locally from around the individual hairs or fibres and thus promotes the coalescence of the particles of rubber floating in the latex to form a sheath of rubber around each hair or fibre.

The surface of the mould may be coated with glycerine, castor oil or other medium, to prevent adhesion of the rubber thereto.

With a loose mass of hair or other fibre of a considerable depth, the weight of the superposed wet fibre may tend somewhat to compress the underlying wet fibre so that the mass whilst very wet tends to sag towards the bottom of the mould. To prevent this, and also to restrict shrinkage whilst drying, mechanical supports may be provided at intervals within the loose mass of hair or other fibre. These supports may be subsequently withdrawn from the mass when partially or completely dry or may be permanently retained therein, according to their nature. For example, thin wooden rods may extend horizontally at horizontal and vertical intervals across the mould from holes in the walls thereof in which their ends are supported. Alternatively strings may be similarly extended across the mould. These rods or strings may be either left in or removed from the dried pad, as desired.

Another means for support of the loose hair or other fibre consists of coiled upholstery springs located at intervals upright within the mould and around which the loose hair or fibre is placed. These coiled springs if helical and of uniform contour can be readily withdrawn from the mass when the latter is dry. Alternatively, they can remain in the dried mass to serve their usual function as upholstery springs, for which purpose they may be of the usual waisted contour or may have a barrel shaped contour.

An upholstery pad produced by the above method, and moulds for use therein and other features of the invention, are illustrated by way of example on the accompanying drawings, in which:—

Figure 1:
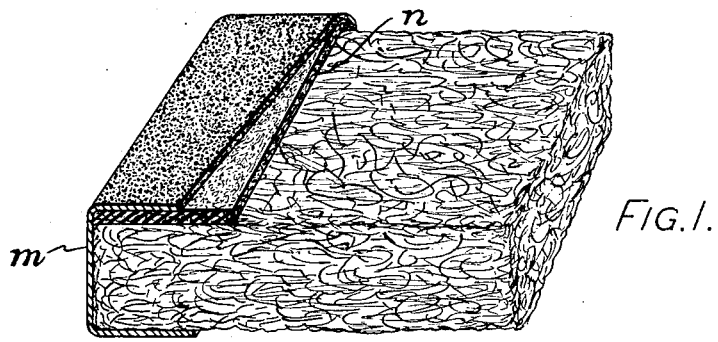
Fig. 1 is a perspective view of an upholstery pad, parts of the cover being broken away.
Figure 2:
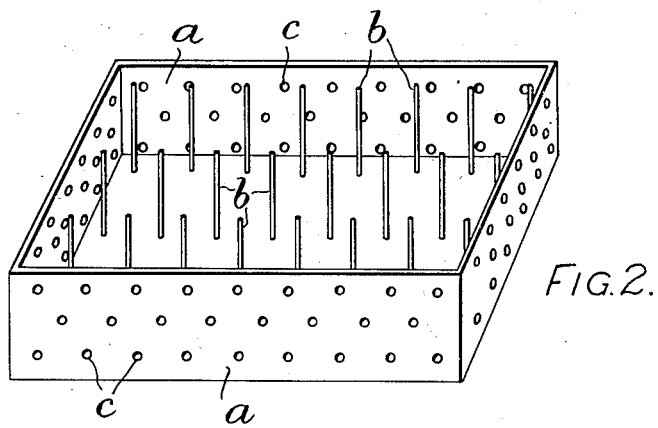
Fig. 2 is a perspective view of a mould having means for preventing the wet fibre from compacting.

Referring more particularly to Fig. 2, $a$ is a mould from the base of which protrude within the mould a number of rods $b$. Fibre, for instance horsehair, is placed substantially without compression in the mould $a$ and around the rods $b$. The mould $a$ with the contained fibre is then turned on end so that the rods $b$ are horizontally disposed, and dipped endwise into adhesive, for instance latex, and lifted out of the adhesive and stood on end to drain.

Holes $c$ are provided in the respective walls of the mould to facilitate the entry and draining of the adhesive.

The mouth of the mould $a$ may be covered by a board, but this is not essential.

The rods $b$ support the fibre, when it is wetted, against sagging under the weight of the adhesive whilst being lifted and whilst draining.

When sufficiently dry to retain its moulded shape if not handled, the mass of wetted fibre is turned out of the mould by inverting the latter.

Figure 3:
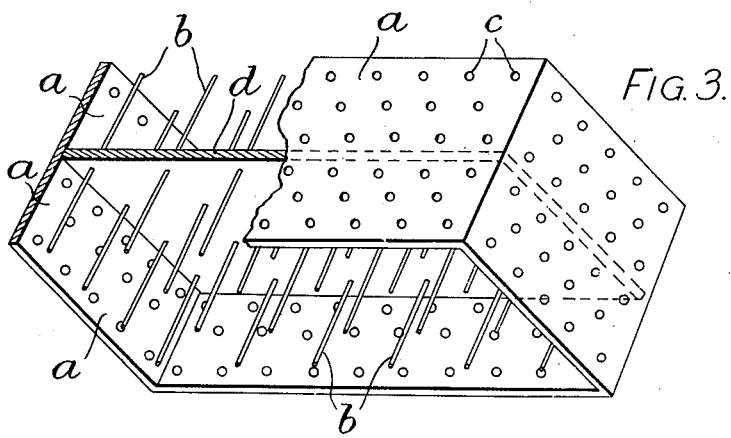
Fig. 3 is a perspective view of a double mould.

Two moulds $a$ may be formed on opposite sides of a base $d$ in common and both may be provided with rods $b$ protruding therefrom, as shown in Fig. 3. After one mould has been filled with fibre and covered by a board, the whole is inverted and the other mould is filled. The duplex mould can then be dipped and drained endwise as above described.

Figure 4:
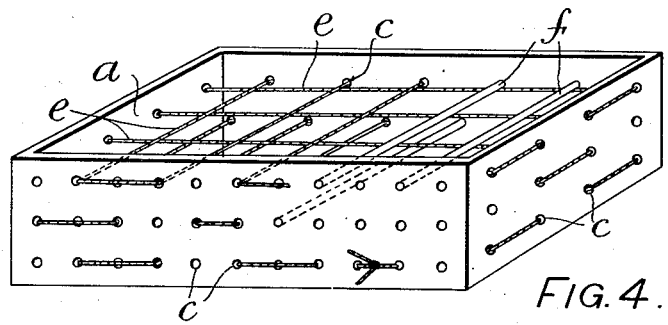
Fig. 4 is a perspective view of a mould showing alternative means for holding the wet fibre against compacting.

Another way of retaining the fibre against sagging in the mould is shown in Fig. 4, wherein strings *e* or rods *f* extend across the mould *a* from holes *c* at horizontal and vertical intervals. These strings *e* are cut to release the moulded fibre from the mould and may remain in the mass of fibre. The rods *f*, if used, can be withdrawn or cut for the same purpose.

Figure 5:
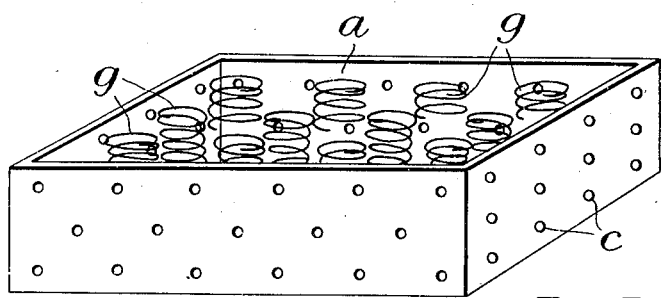
Fig. 5 is a perspective view of a mould showing a further alternative.

Fig. 5 shows upholstery springs *g* arranged in the mould *a* to support the wetted fibre against sagging. These springs *g* may either be subsequently screwed out of the moulded and dried mass or may remain therein as reinforcements.

Figure 6:
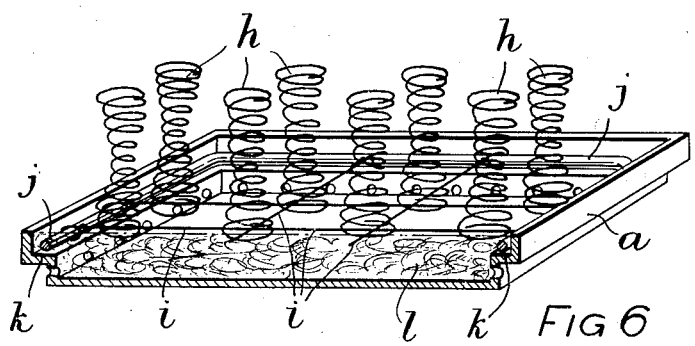
Fig. 6 is a perspective sectional view of a mould showing the formation of an upholstery pad affixed to upholstery springs.

Upholstery springs *h* may be attached to a pad of moulded loosely associated horsehair or other fibre, by being embedded by one end therein as shown in Fig. 6. These springs *h* are attached to a reticulated stringing *i* extending across a wire frame *j* supported on a ledge *k* in the mould *a* and over and under which a fibre pad *l* is moulded, as above described.

The upholstery pads produced by the method according to this invention can be covered with or enclosed in and distend a fabric covering *m* as usual. A sheet *n* of sponge rubber, cotton wool or felt may be interposed between the cover and pad.

We claim:

1. A method of producing an upholstery pad, consisting in wetting with an adhesive and forming to the shape it is to have in use a mass of intermingled upholstery fibres in a loosely associated condition, and drying said mass while maintaining it in said shape and in open-mesh condition.

2. A method of producing an upholstery pad, consisting in wetting with an adhesive and forming to the shape it is to have in use a mass of intermingled hair in a loosely associated condition, and drying said mass while maintaining it in said shape and in open-mesh condition.

3. A method of producing an upholstery pad, consisting in wetting with a liquid dispersion of rubber and forming to the shape it is to have in use a mass of intermingled upholstery fibres in a loosely associated condition, and drying said mass while maintaining it in said shape and in open-mesh condition.

4. A method of producing an upholstery pad, consisting in wetting with a liquid dispersion of rubber and forming to the shape it is to have in use a mass of intermingled hair in a loosely associated condition, and drying said mass while maintaining it in said shape and in open-mesh condition.

5. A method of producing an upholstery pad, consisting in confining a mass of intermingled upholstery fibres in a mould in a loosely associated condition, dipping said mould and confined mass in an adhesive, draining said mould and confined mass, and drying said confined mass in substantially the shape imparted to it by the mould and in an open mesh condition.

6. A method of producing an upholstery pad, consisting in confining a mass of intermingled hair in a mould in a loosely associated condition, dipping said mould and confined mass in an adhesive, draining said mould and confined mass, and drying said confined mass in substantially the shape imparted to it by the mould and in an open-mesh condition.

7. A method of producing an upholstery pad, consisting in confining a mass of intermingled horsehair in a mould in a loosely associated condition, dipping said mould and confined mass in an adhesive, draining said mould and confined mass, and drying said confined mass in substantially the shape imparted to it by the mould and in an open mesh condition.

8. A method of producing an upholstery pad, consisting in confining a mass of intermingled upholstery fibres in a mould in a loosely associated condition, dipping said mould and confined mass in a liquid dispersion of rubber, draining said mould and confined mass, and drying said confined mass in substantially the shape imparted to it by the mould and in an open mesh condition.

9. A method of producing an upholstery pad, consisting in confining a mass of intermingled hair in a mould in a loosely associated condition, dipping said mould and confined mass in a liquid dispersion of rubber, draining said mould and confined mass, and drying said confined mass in substantially the shape imparted to it by the mould and in an open mesh condition.

10. A method of producing an upholstery pad, consisting in confining a mass of intermingled horsehair in a mould in a loosely associated condition, dipping said mould and confined mass in a liquid dispersion of rubber, draining said mould and confined mass, and drying said confined mass in substantially the shape imparted to it by the mould and in an open mesh condition.

11. An upholstery pad comprising a mould-shaped, open mesh mass of intermingled upholstery fibres in a loosely associated condition and held in association by an adhesive.

12. An upholstery pad comprising a mould-shaped, open mesh mass of intermingled hair in a loosely associated condition and held in association by an adhesive.

13. An upholstery pad comprising a mould-shaped, open mesh mass of intermingled upholstery fibres in a loosely associated condition and held in association by rubber.

14. An upholstery pad comprising a mould-shaped, open mesh mass of intermingled hair in a loosely associated condition and held in association by rubber.

15. A cushioning element comprising an open mesh structure of fibrous material and a flexible bonding material holding the fibres together at their crossing positions by adhesion as a thin surface coating, said element having the fibres at its surface, substantially throughout the extent thereof, disposed pronouncedly more in directions approximately parallel to the surface than in directions approximately normal to the surface.

16. A cushioning element comprising an open mesh structure of fibrous material and a covering of rubber on the fibres holding them together at their crossing positions by adhesion as a thin surface coating, said element having the fibres at its surface, substantially throughout the extent thereof, disposed pronouncedly more in directions approximately parallel to the surface than in directions approximately normal to the surface.

17. The method of making a cushioning element which comprises forming an open mesh structure of fibrous material and bonding the fibres to each other at their crossing positions by depositing a flexible bonding material thereon from a liquid carrier as a thin surface coating, giving to the structure the shape that it is to have in use while maintaining its open mesh character and thereafter setting the bonding material.

18. The method of making a cushioning element which comprises forming an open mesh structure of fibrous material and securing the fibres together at their crossing positions by depositing rubber thereon as a thin surface coating, giving to the structure the shape that it is to have in use while maintaining its open mesh character, and thereafter vulcanizing the rubber.

19. In combination with a flexible cover therefor, a cushioning element comprising an integral, open-mesh structure of fiber and a flexible material bonding fibers of the structure to each other at their crossing positions, the said integral structure being of such shape as substantially to fit the said cover on a plurality of adjacent faces angularly disposed with relation to each other.

20. The method of making a cushioning element for use in a flexible cover therefor which comprises forming an integral, open-mesh structure of fibers and bonding fibers of the said structure to each other at their crossing positions by a flexible bonding material, the said integral structure being determinately shaped substantially to fit the said cover on a plurality of adjacent faces angularly disposed with relation to each other.

21. A method as defined in claim 17 in which the fibrous material is sprayed with the bonding material in the liquid carrier.

22. A method as defined in claim 18 in which the fibrous material is sprayed with the rubber in a liquid carrier.

23. A method as defined in claim 20 in which fibers of the structure are bonded to each other by spraying them with rubber in a liquid carrier.

24. A combination as defined in claim 19 in which the bonding material is rubber.

25. A method as defined in claim 20 in which the fibers are bonded together by treating them with rubber in a liquid carrier.

In testimony whereof we have signed our names to this specification.

ARTHUR ERNEST WEBER.
JOSEPH ARTHUR HOWARD.